United States Patent
Vogtmeier et al.

(10) Patent No.: US 8,564,084 B2
(45) Date of Patent: Oct. 22, 2013

(54) RADIATION DETECTION AND A METHOD OF MANUFACTURING A RADIATION DETECTOR

(75) Inventors: Gereon Vogtmeier, Aachen (DE);
Christoph Herrmann, Aachen (DE);
Klaus Juergen Engel, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 323 days.

(21) Appl. No.: 12/996,400

(22) PCT Filed: Jun. 9, 2009

(86) PCT No.: PCT/IB2009/052442
§ 371 (c)(1),
(2), (4) Date: Dec. 6, 2010

(87) PCT Pub. No.: WO2010/004453
PCT Pub. Date: Jan. 14, 2010

(65) Prior Publication Data
US 2011/0079865 A1 Apr. 7, 2011

(30) Foreign Application Priority Data
Jun. 16, 2008 (EP) .................................. 08158304

(51) Int. Cl.
*H01L 31/115* (2006.01)
*H01L 21/00* (2006.01)

(52) U.S. Cl.
USPC ............ 257/429; 257/E21.002; 257/E31.124; 438/57

(58) Field of Classification Search
USPC .............. 257/429, E21.002, E31.124; 438/57
See application file for complete search history.

(56) References Cited

U.S. PATENT DOCUMENTS

| 6,509,203 B2 | 1/2003 | Spartiotis et al. |
| 2007/0172027 A1 | 7/2007 | Li et al. |
| 2007/0211858 A1 | 9/2007 | Franklin et al. |
| 2008/0203309 A1* | 8/2008 | Frach et al. .................... 250/362 |
| 2009/0256223 A1 | 10/2009 | Yamamura et al. |

FOREIGN PATENT DOCUMENTS

| JP | 58142283 A | 8/1983 |
| JP | 59064587 A | 4/1984 |
| JP | 59065487 A2 | 4/1984 |
| JP | 63028076 A2 | 2/1988 |
| JP | 01172792 A | 7/1989 |
| JP | 2003-004855 * | 1/2003 |
| JP | 2003-007993 * | 1/2003 |
| JP | 2003004855 A | 1/2003 |
| JP | 2003086826 A | 3/2003 |
| JP | 2003086827 A | 3/2003 |
| JP | 2008004547 A | 1/2008 |

* cited by examiner

*Primary Examiner* — David S Blum

(57) ABSTRACT

The invention relates to a radiation detector (10), comprising an array of pixels (1), wherein each pixel (1) comprises a conversion layer of a semiconductor material (4) for converting incident radiation into electrical signals and wherein each pixel (1) is surrounded by a trench (3) that is at least partly filled with a barrier material that absorbs at least a part of photons generated by the incident radiation. The invention also relates to a method of manufacturing such a radiation detector (10).

17 Claims, 3 Drawing Sheets

RADIATION DETECTION AND A METHOD OF MANUFACTURING A RADIATION DETECTOR

FIELD OF THE INVENTION

The invention relates to a radiation detector and a method of manufacturing a radiation detector. Moreover, it relates to an X-ray detector and an imaging system comprising such a radiation detector.

BACKGROUND OF THE INVENTION

Radiation detectors, having an array of pixels, are applied in, for example, CT imaging systems, to provide a sufficiently accurate measure of the radiation incident on the detector after it has left a scanned object. The use of easy to manufacture semiconductor material, such as silicon, for the radiation detector is beneficial in view of for example costs, compared to, for example, Cd(Zn)Te as a sensor material. Although Cd(Zn)Te has a much higher stopping power than silicon and exhibits much less Compton scatter resulting in inter-pixel crosstalk, Cd(Zn)Te shows significant K-fluorescence, which deteriorates the energy resolution and can also cause inter-pixel crosstalk. Furthermore, Cd(Zn)Te is an expensive material, difficult to manufacture in large sizes and, due to its brittleness, exhibits limitations as to layer thicknesses. In contrast, the K-fluorescence in radiation detectors based on a semiconductor material, such as silicon, is negligible. While silicon is almost transparent for upper X-ray energies (round 100 keV), photon energies below 35 keV are well absorbed. However, for medium photon energies a high probability for Compton scatter exists, which alters the photon direction as well as its energy, giving rise to spatial and spectral crosstalk between neighbouring and further away pixels. Also in contrast to Cd(Zn)Te, semiconductor based radiation detectors can profit from an experienced and well-known semiconductor technology routinely used in industry.

One major disadvantage of such a semiconductor based radiation detector is the amount of crosstalk between pixels, mainly due to Compton scatter, that reduces the image quality. This is the case for any relevant pixel size, since Compton scattered photons traverse far distances up to the range of centimeters within silicon and therefore easily induce spatial crosstalk between pixels which are not adjacent.

JP59064587 discloses a radiation detector for reducing the crosstalk between adjacent radiation detectors caused by radioactive rays scattering on the radiation detectors in an X-ray CT unit. Semiconductor radiation detectors and signal-takeout mounts are fixed onto a collimator board made of a metal with a high capability to stop radioactive rays. The collimator board, while attenuating the effect the scattering of radioactive rays between adjacent radiation detectors, functions as a negative electrode which greatly reduces crosstalk between adjacent radiation detectors caused by scattered radioactive rays. A disadvantage of this radiation detector is that only cross-talk is reduced between adjacent radiation detectors and not between the pixels of each radiation detector. Furthermore, it requires a complicated fabrication process in which the radiation detectors are mounted on a collimator board that reduces the crosstalk between the radiation detectors.

SUMMARY OF THE INVENTION

It is an object of the invention to provide a radiation detector in which the cross-talk is not only reduced between the different detectors but also between the different pixels of each radiation detector, the manufacturing of which is easy to integrate in the existing manufacturing process. The invention is defined by the independent claims. Advantageous embodiments are defined by the dependent claims.

This object is achieved by providing a trench in the semiconductor material which trench surrounds each pixel and is at least partly filled with a barrier material that absorbs at least a part of the photons generated by the incident radiation. Thus the trench, surrounding each pixel, has the property that it is able to absorb a part of the radiation generated photons, thereby reducing the crosstalk scattering of the incident radiation between the pixels. In this way the amount of radiation crosstalk that enters from a pixel into an adjacent pixel is reduced. Furthermore, the trench can be integrated in a simple way in a standard semiconductor process for manufacturing the radiation detector according to the invention. For example, a CMOS (Complementary Metal Oxide Semiconductor) process for the manufacture of the radiation detector according to the invention provides for a simple and cheap manufacturing of the radiation detector according to the invention in which the manufacturing of the trench is integrated in a simple way. Advantageously the semiconductor material comprises silicon for which standard and cheap manufacturing processes are available.

In an embodiment of the radiation detector according to the invention, each pixel comprises an array of sub-pixels and each sub-pixel is surrounded by the trench. This further reduces the amount of crosstalk in the radiation detector. In another embodiment a cluster of adjacent sub-pixels is surrounded by the trench. This allows for an optimization of the size of the active area of the sub-pixels and reduction of the cross-talk, because the trench occupies an area which reduces the active area of the pixels and sub-pixels but on the other hand reduces the cross-talk. This, for example, allows for an increased coverage of the active area of the array of sub-pixels at the cost of accepting some spatial crosstalk between sub-pixels of the array.

In an embodiment of the radiation detector according to the invention, the barrier material comprises a material which does not show K fluorescence above an energy of 35 keV. Thus undesired crosstalk effects can be minimized.

In an embodiment of the radiation detector according to the invention, the filling factor of the barrier material in the trench varies programmably across the detector. In this way it is achieved that a first portion of the trench has a filling factor or filling volume of the barrier material that is different from the filling factor or filling volume of a second portion of the trench. For example, the first portion of the trench surrounds a pixel and the second portion of the trench surrounds a sub-pixel or a cluster of sub-pixels. This advantageously provides for optimization between the material used for filling, the size of the trench and the resulting quality of the filling process.

In an embodiment of the radiation detector according to the invention, the barrier material is a material with a medium atomic number Z. This provides for an effective absorption of the photons in the trench that are generated by the incident radiation. Advantageous materials for the barrier material are molybdenum, silver or tungsten.

In an embodiment of the radiation detector according to the invention, the trench has a depth in the conversion layer in the range between 20 μm and 600 μm. This provides for a depth of the trench that corresponds to the maximum depth that the photons penetrate into the layer of the semiconductor material, thereby minimizing the cross-talk.

The object is also achieved by a method of manufacturing the radiation detector according to the invention in which the trench is provided in a substrate of a semiconductor material after which the surfaces of the trench are covered with an isolation layer. Thereafter an array of pixels is manufactured on the substrate whereby each pixel is surrounded by the trench. Finally, the trench is at least partly filled with a barrier material that absorbs at least a part of the photons generated by the incident radiation. The steps that are required for providing the trench and the at least partly filling of the trench are all processing steps that can be integrated in a standard semiconductor manufacturing process, thus resulting in a cheap and simple manufacturing of the radiation detector according to the invention.

The creation of the trench in the substrate may be done by, for example, Deep Reactive Ion Etching (DRIE) in which the form or geometry of the trench is mainly vertical. Alternatively, wet etching technologies may be used to create the trench in the substrate. These different etching technologies may be applied to adjust the form of the trench to achieve an optimized filling of the trench with the barrier material In an embodiment of the method according to the invention, the step of at least partly filling the trench comprises the step of a selective disposal of the barrier material inside the trench by a dispenser device. In this way the barrier material can be applied sequentially in the trench. For example, an ink jet printer disposes the barrier material inside the trench. This is an example of a simple way of applying the barrier material inside the trenches. Furthermore, this provides for the selective disposal of portions of the trench with different volumes of barrier material. For example, a first portion of the trench can be filled with a different filling volume of the barrier material than a second portion of the trench.

As an example, a metal powder embedded in epoxy glue can be applied as the barrier material in the method according to the invention. Advantageously the epoxy glue can simultaneously be used as glue to mount another device on top of the trench, for example an anti-scatter grid.

In another embodiment of the method according to the invention, the step of at least partly filling the trench comprises the step of applying a masking layer that defines openings for those parts of the trench that are to be filled at least partly. This allows for applying the barrier material in one process step in the trench on the entire substrate.

The object is also achieved by an X-ray detector comprising a radiation detector according to the invention and by an imaging system, particularly an X-ray, CT, PET, SPECT or nuclear imaging device, comprising an X-ray radiation detector according to the invention.

A radiation detector according to the present invention may serve for the quantitative and/or qualitative detection of electromagnetic radiation, particularly X-radiation or γ-radiation.

The radiation detector will usually have additional components like shutters, anti-scatter grids, electronic circuits, housings and the like that were not explicitly mentioned as they are obvious for a person skilled in the art, wherein these components are usually arranged in such a way that it makes only sense to irradiate photons onto the detector from a particular entrance direction with respect to this detector.

BRIEF DESCRIPTION OF THE DRAWINGS

Like reference numbers refer in the Figures to identical or similar components.

DETAILED DESCRIPTION OF EMBODIMENTS

Figure 1:
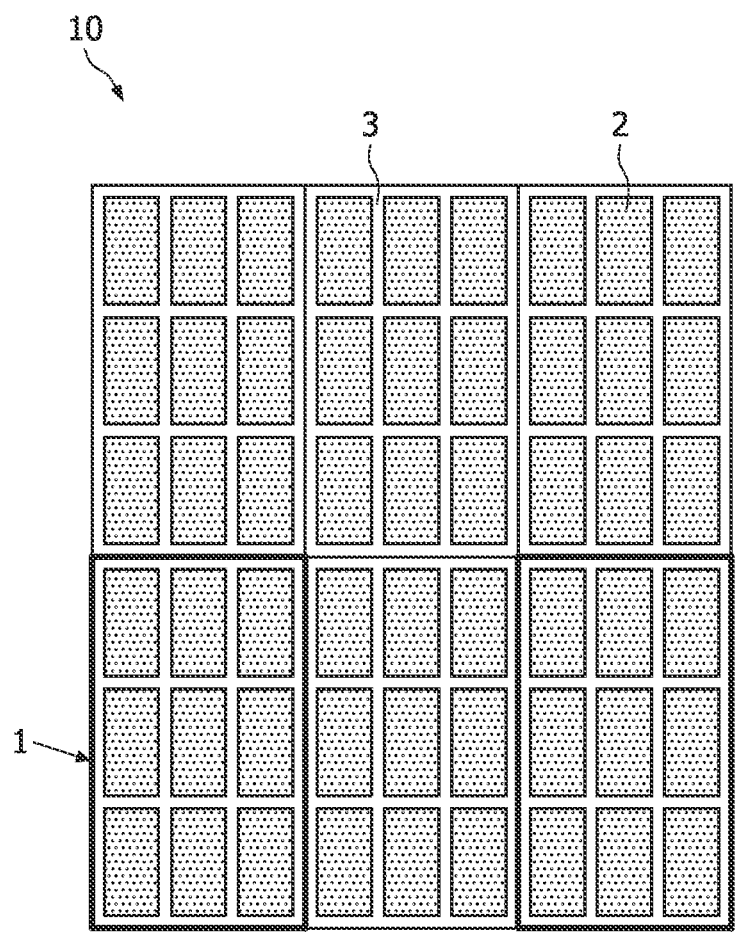
FIG. 1 shows schematically a top view of a part of a radiation detector according to the invention.

"Spectral CT" is considered to have the potential of revolutionizing present CT systems in such a way that spectral information contained in the poly-chromatic X-ray beam generated by an X-ray tube and passing a scanned object is used to provide new and diagnostically critical information. The enabling technology for Spectral CT imaging systems is a detector which can provide a sufficiently accurate estimate of the energy spectrum of the photons hitting the detector behind the scanned object. Since for image reconstruction reasons the detector is also exposed to the direct beam, the photon count rates in a detector pixel seeing the direct beam are huge (approximately $10^9$ photons per $mm^2$ and second, i.e. 1000 Mcps per $mm^2$). Readout electronics are however expected to be able to cope with not more than 10 Mcps. To limit the counting rates, it is possible to sub-structure the sensor part of a detector (in which an X-ray photon interacts and generates a charge pulse, which is further evaluated by the readout electronics) into small sub-pixels (e.g. 300 μm×300 μm) as well as into several different sensor layers (three-dimensional sub-structuring), wherein each sub-pixel in a sensor layer has its own energy-resolving readout electronics channel with sub-channels for each energy.

As a sensor material for Spectral CT, CZT or CdTe are of interest due to their relatively high X-ray stopping power (about 3 mm thick CZT is considered sufficient to fully replace a currently used GOS scintillator). However, this high stopping power is to some extent also a disadvantage: in order to limit the maximum count rate of a sub-pixel within a sensor layer to about 10 Mcps so that the serving readout electronics channel only rarely sees pulse pile-up, the first sensor layers (of a 300 μm×300 μm pixel) would need thicknesses considerably below 100 μm. It is questionable whether these thin layers of CZT can be manufactured due to the brittleness of CZT. In addition, due to the much smaller aspect ratio, defined as thickness divided by "lateral extension", the advantages of the small pixel effect are lost in those very thin layers below a thickness of 100 μm.

To address the above problems, a material with low stopping power like silicon is proposed as the sensor material for Spectral CT, possibly in conjunction with CZT or CdTe also used in counting mode, or even with an energy-integrating GOS layer. Due to the low atomic number Z=14 of Si, the X-ray attenuation is much smaller than in case of CZT or CdTe. Consequently, the layer thickness of the top layer of a stacked detector made of Si in an energy-resolving counting detector to achieve count rates not higher than 10 Mcps is in the range of 1.7 mm. The thickness of conversion layers below the top layer may even sequentially increase from layer to layer. Hence, a Spectral CT detector consisting of several layers of Si as a direct conversion material can readily be manufactured. Further advantages of Si are that it is much cheaper than CZT, much simpler to manufacture (potentially even in standard CMOS fabs), and nearly free of K-fluorescence cross-talk, since the K-edge energy is below 2 keV and the fluorescence yield (i.e. the measure for how often interactions with K-fluorescence happens) is only 4.1%.

FIG. 1 shows a top view of a part of a radiation detector 10 having a 2×3 array of pixels 1 and a 3×3 array of sub-pixels 2 for each pixel 1. The photons that are generated in the pixels 1 and the sub-pixels 2 are detected by read-out electronics (not shown) that is connected to the pixels 1 and the sub-pixels 2. In this case a trench 3 surrounds each pixel 1 and each sub-pixel 2. The trench 3 is provided in a substrate 4 (not shown) on which the pixels 1 and the sub-pixels 2 are provided as well. The trench 3 is filled with a barrier material that reduces the amount of crosstalk between the pixels 1 and between the sub-pixels 2 by absorbing a part of the photons that are generated by radiation incident on the radiation detector 10. The most effective barrier material has a medium z-number. For example molybdenum, silver or tungsten are suitable barrier material. Materials with high z-numbers are less suitable if their K-edge lies above or within the energy interval of 35-70 keV, for which cross-talk mainly occurs; in this case the barrier material would suffer from K-fluorescence and lower absorption efficiency below the K-edge.

Figure 2A:
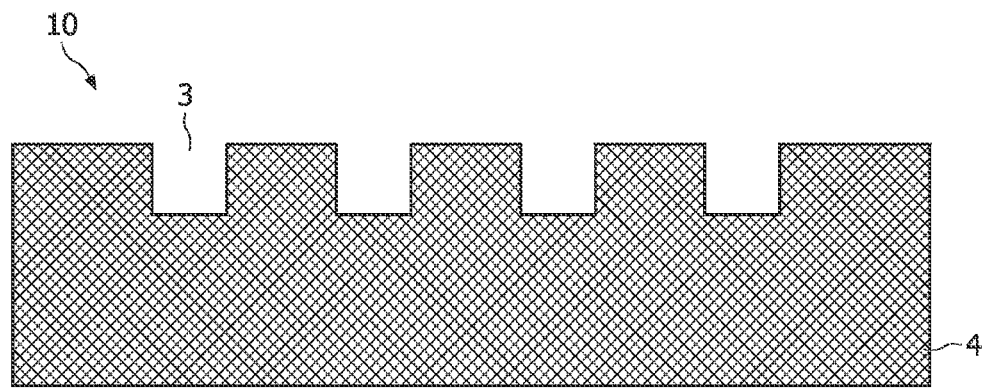
FIGS. 2a-c illustrate schematically a method of manufacturing a radiation detector according to the invention showing cross-sectional views of a part of the radiation detector.
Figure 2B:
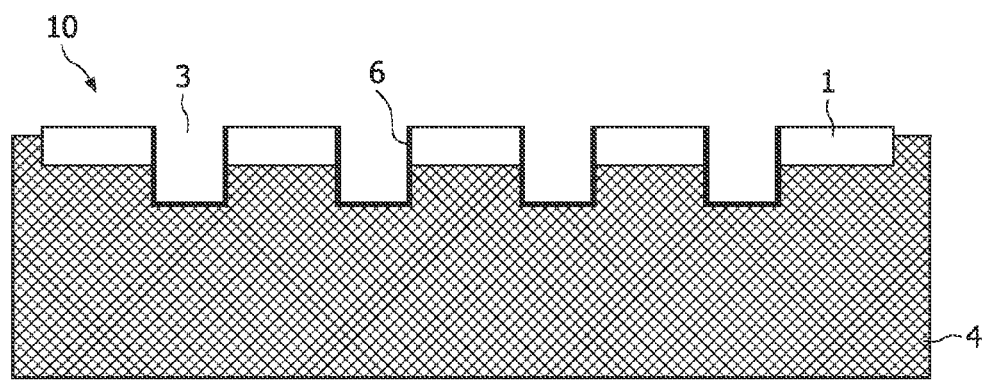
Figure 2C:
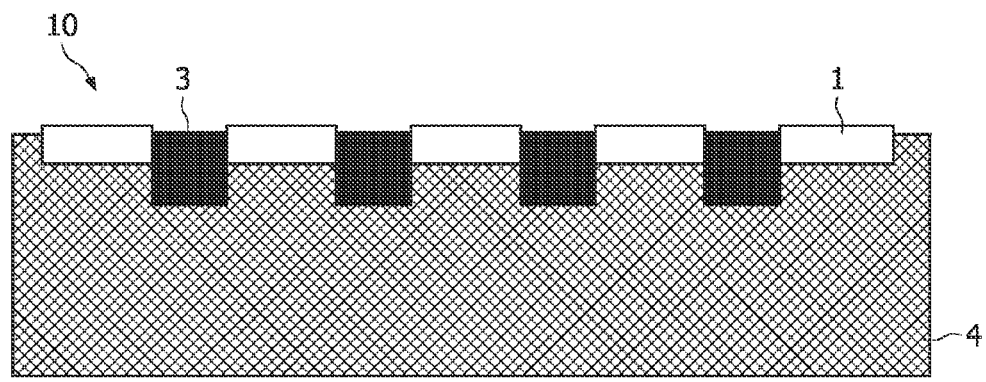

FIGS. 2a-c illustrate a method of manufacturing a radiation detector 10 according to the invention showing cross-sectional views of a part of the radiation detector 10. In a substrate 4, in this example comprising silicon, trenches 3 are formed by applying, in this case, DRIE ("Deep Reactive Ion Etching") etching which results in relatively straight and vertical walls for the trenches 3, as is shown in FIG. 2a. For example an oxide masking layer can be applied to define the area where the trenches 3 are formed. The depth of the trenches 3 is preferably in the range of 20 µm to 600 µm depending on the thickness of the substrate 4 and on the maximum depth that the X-ray photons reach inside the substrate 4 causing the cross-talk. The width or size of the trenches 3, defining the distance between neighbouring pixels 1 and sub-pixels 2, is for example in the range of 50 µm to 300 µm, depending on the size of the pixels 1 and the sub-pixels 2.

Next, pixels 1 are provided in between the trenches 3 by, for example, a standard CMOS process, as is shown in FIG. 2b. Furthermore, the walls and the bottom of the trenches are provided with an isolation layer 6. This process step may be done by any well-known isolation layer forming step such as thermal oxidation or passivation. This step of forming the isolation layer 6 may be done before, during or after the manufacturing of the pixels 1. Then the trenches 3 are filled with a suitable barrier material, as is shown in FIG. 2c. The isolation layer 6 provides at least for electrical isolation between the barrier material that is in the trenches 3 and the substrate 4, the pixels 1 and the sub-pixels 2. The filling of the trenches 3 can be done completely or partly. By applying a suitable technology, it is even possible to manufacture a radiation detector 10 in which the filling factor of the trenches 3 with the barrier material varies across the radiation detector. For example, the trenches 3 surrounding a pixel 1 are filled to a different extent than the trenches 3 that surround a sub-pixel. A suitable technology is, for example, ink jet printing, in which the trenches 3 are filled in a kind of sequential way. In this way it is possible to selectively dispose the barrier material in the trenches 3 and to program or adjust the filling factor of the trenches 3 as a function of the location of the portion of the trench 3 on the substrate 4. Another suitable technology is, for example, screen printing in which a masking layer is applied defining openings on locations where portions of the trenches 3 are to be filled at least partly. After that another filling step can be applied or, optionally, a second masking layer can be applied to fill the remaining portions of the trenches 3 and to increase the filling factor of the trenches 3 that were already filled at least partly by the previous masking layer step.

For example, a metal powder embedded in epoxy glue can be applied as the barrier material. The grain size of the metal powder and the epoxy can be optimized dependent on the depth of the trenches 3 to achieve an optimum filling of the trenches 3. Additionally the epoxy is also used as glue for mounting, for example, an ASG ("Anti Scatter Grid") on top of the detector 10, resulting in an optimized temperature coefficient matching between the radiation detector 10 and the ASG.

A pre-annealing processing step and a front-side wafer cleaning step can advantageously be applied before a final curing step hardens the barrier material.

Figure 3:
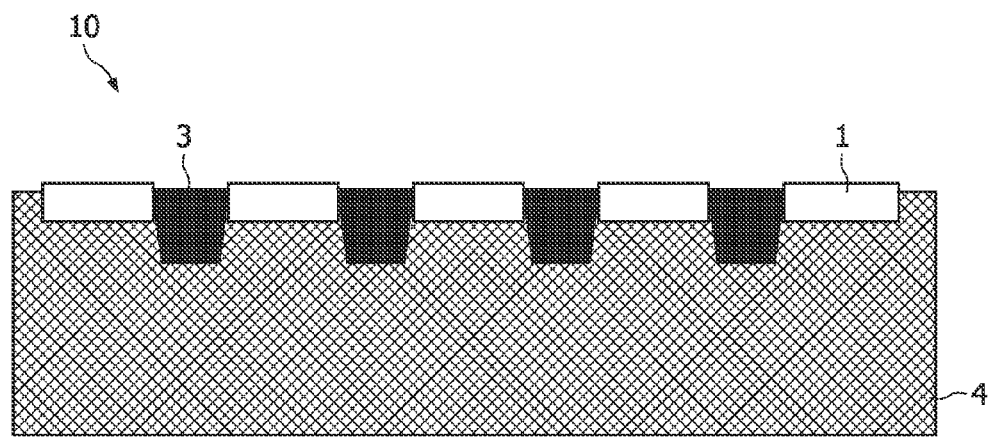
FIG. 3 illustrates schematically a radiation detector according to the invention showing a cross-sectional view of a part of the radiation detector.

Other etching techniques can be applied resulting in different geometries for the trenches 3 than when applying DRIE etching. For example, a wet etching technique can be applied, using KOH as etchant, which is a faster etching process than dry etching, and which results in less straight but more inclined walls for the trenches 3, as is shown in FIG. 3.

On top of the at least partly filled trenches 3 a layer of reflective material can be provided to prevent the radiation from entering the barrier material.

The radiation detector according to the invention is not limited to cross-talk suppression in CT with energy-resolving X-ray photon counting, but is also be beneficial for the suppression of cross-talk in Si detectors comprising pixels.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A radiation detector, comprising:
an array of pixels, wherein each pixel comprises:
a conversion layer of a semiconductor material for converting incident radiation into electrical signals, wherein each pixel is surrounded by a trench that is at least partly filled with a barrier material that absorbs at least a part of photons generated by the incident radiation, the barrier material having a filling factor in the trench which varies programmably across the detector; and
an array of sub-pixels.

2. The radiation detector according to claim 1, wherein each sub-pixel is surrounded by the trench.

3. The radiation detector according to claim 1, wherein a cluster of adjacent sub-pixels is surrounded by the trench.

4. The radiation detector according to claim 1, wherein the barrier material comprises a material which does not show K fluorescence above an energy of 35 keV.

5. The radiation detector according to claim 1, wherein the barrier material comprises molybdenum, silver or tungsten.

6. The radiation detector according to claim 1, wherein the barrier material is a material with a medium atomic number Z.

7. The radiation detector according to claim 1, wherein the trench has a depth in the conversion layer in the range between 20 µm and 600 µm.

8. A method of manufacturing a radiation detector comprising the steps of:
providing a substrate) of a semiconductor material;
providing a trench in the substrate;
covering the surfaces of the trench with an isolation layer;
providing an array of pixels on the substrate wherein each pixel is surrounded by the trench and each pixel includes an array of sub-pixels;
at least partly filling the trench with a barrier material that absorbs at least a part of photons generated by the incident radiation, wherein a filling factor barrier material in the trench varies programmably across the detector.

9. A method as claimed in claim 8, wherein the step of at least partly filling the trench comprises the step of a selective disposal of the barrier material inside the trench by a dispenser device.

10. A method as claimed in claim 8, wherein the step of at least partly filling the trench comprises the step of applying a masking layer that defines openings for those parts of the trench that are to be filled at least partly.

11. An X-ray detector comprising a radiation detector according to claim 1.

12. The method as claimed in claim 8, wherein the barrier material comprises a material which does not show K fluorescence above an energy of 35 keV.

13. The method as claimed in claim 8, wherein the barrier material comprises molybdenum, silver or tungsten.

14. The method as claimed in claim 8, wherein the barrier material is a material with a medium atomic number Z.

15. The method as claimed in claim 8, wherein each sub-pixel is entirely surrounded by the trench.

16. An imaging system, comprising:
an X-ray radiation detector, including:
an array of pixels, wherein each pixel comprises:
a conversion layer of a semiconductor material for converting incident radiation into electrical signals, wherein each pixel is surrounded by a trench that is at least partly filled with a barrier material that absorbs at least a part of photons generated by the incident radiation, and a filling factor of the barrier material in the trench varies programmably across the detector; and
an array of sub-pixels.

17. The imaging system as claimed in claim 16, wherein the imaging system includes one of an X-ray, CT, PET, SPECT or nuclear imaging device.

* * * * *